(12) United States Patent
Messner

(10) Patent No.: US 6,370,514 B1
(45) Date of Patent: Apr. 9, 2002

(54) METHOD FOR MARKETING AND REDEEMING VOUCHERS FOR USE IN ONLINE PURCHASES

(76) Inventor: Marc A. Messner, 111 S. Crosstimber Trail, Edmond, OK (US) 73034-7055

(*) Notice: Subject to any disclaimer, the term of this patent is extended or adjusted under 35 U.S.C. 154(b) by 0 days.

(21) Appl. No.: 09/366,015

(22) Filed: Aug. 2, 1999

(51) Int. Cl.[7] .............................................. G06F 17/60
(52) U.S. Cl. ...................................................... 705/14
(58) Field of Search ............................. 705/1, 10, 14; 235/383

(56) References Cited

U.S. PATENT DOCUMENTS

| | | | | |
|---|---|---|---|---|
| 5,710,886 | A | * | 1/1998 | Christensen et al. .......... 705/14 |
| 5,774,883 | A | * | 6/1998 | Andersen et al. ......... 705/35 X |
| 6,193,155 | B1 | * | 2/2001 | Walker et al. ............... 235/381 |
| 6,240,397 | B1 | * | 5/2001 | Sachs ....................... 705/14 X |
| 2001/0007098 | A1 | * | 7/2001 | Hinrichs et al. .............. 705/14 |

FOREIGN PATENT DOCUMENTS

| | | | | |
|---|---|---|---|---|
| WO | WO 97/37737 | * | 10/1997 | .................. 705/14 |
| WO | WO 99/52026 | * | 10/1999 | .................. 705/14 |

OTHER PUBLICATIONS

"The Web gets back to Basics" by Meredith Schwartz, Dec. 1, 2000, Gifts & Decorative Accessories.*

"Your Guide to Online Investing" by Geoffrey Smith, May 24, 1999, Business Week.*

* cited by examiner

Primary Examiner—Stephen Gravini
(74) Attorney, Agent, or Firm—Edward L. White

(57) ABSTRACT

A method for marketing and redeeming vouchers (meaning gift certificates or coupons) for use in online purchases is disclosed. The method includes the use of a centralized voucher server for processing transactions. A purchaser may buy a gift certificate through a number of routes such as a brick and mortar store, via the telephone, or via an online connection. The gift certificate can be delivered to a recipient by regular mail, email, telephone or the like. The purchaser can select one or more merchants by type or category of goods sold at which the gift certificate will apply. Merchants may offer coupons through a number of venues for redemption via the voucher server.

16 Claims, 9 Drawing Sheets

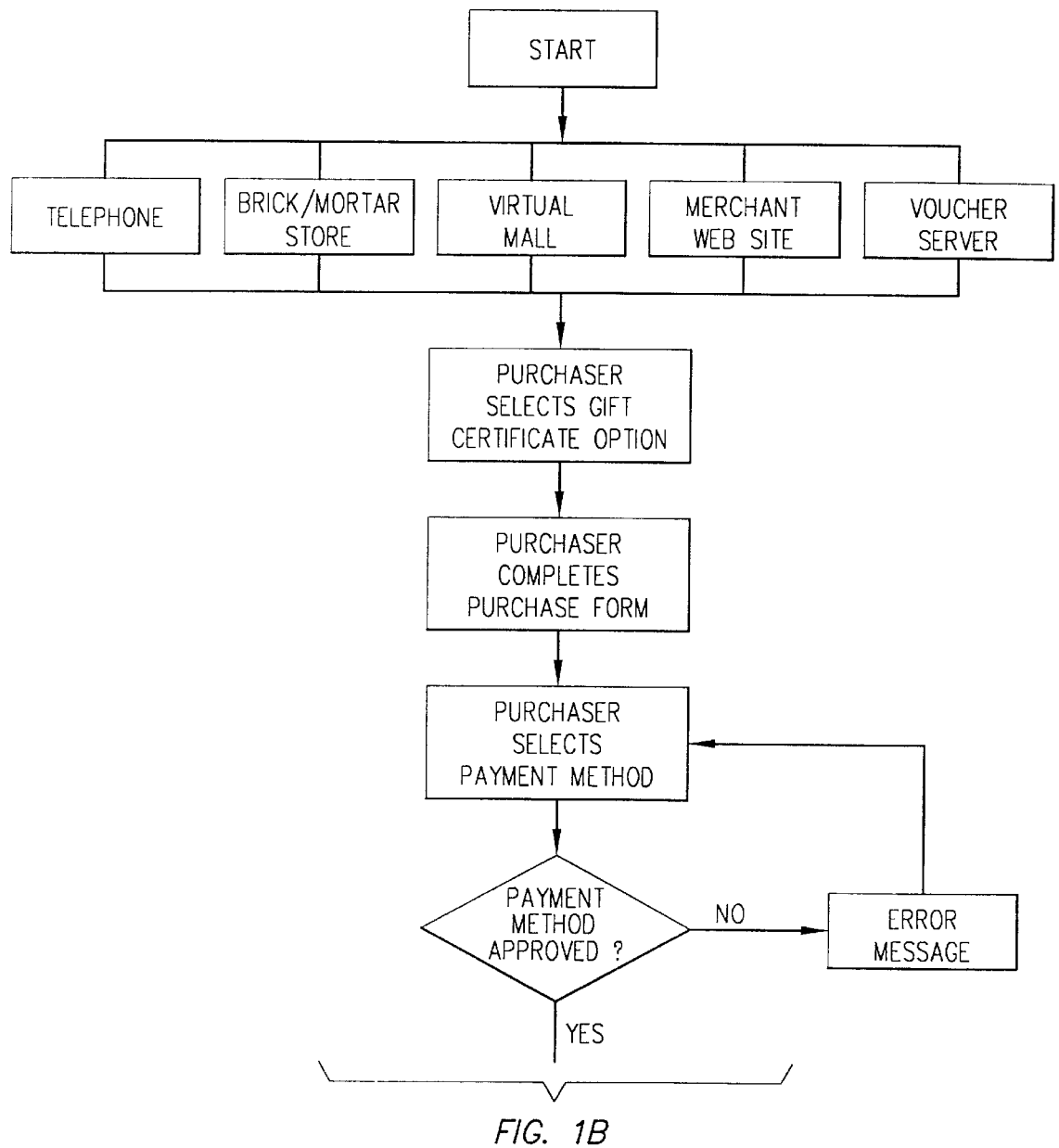
FIG. 1B
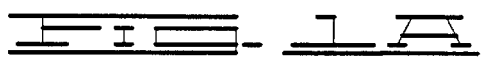

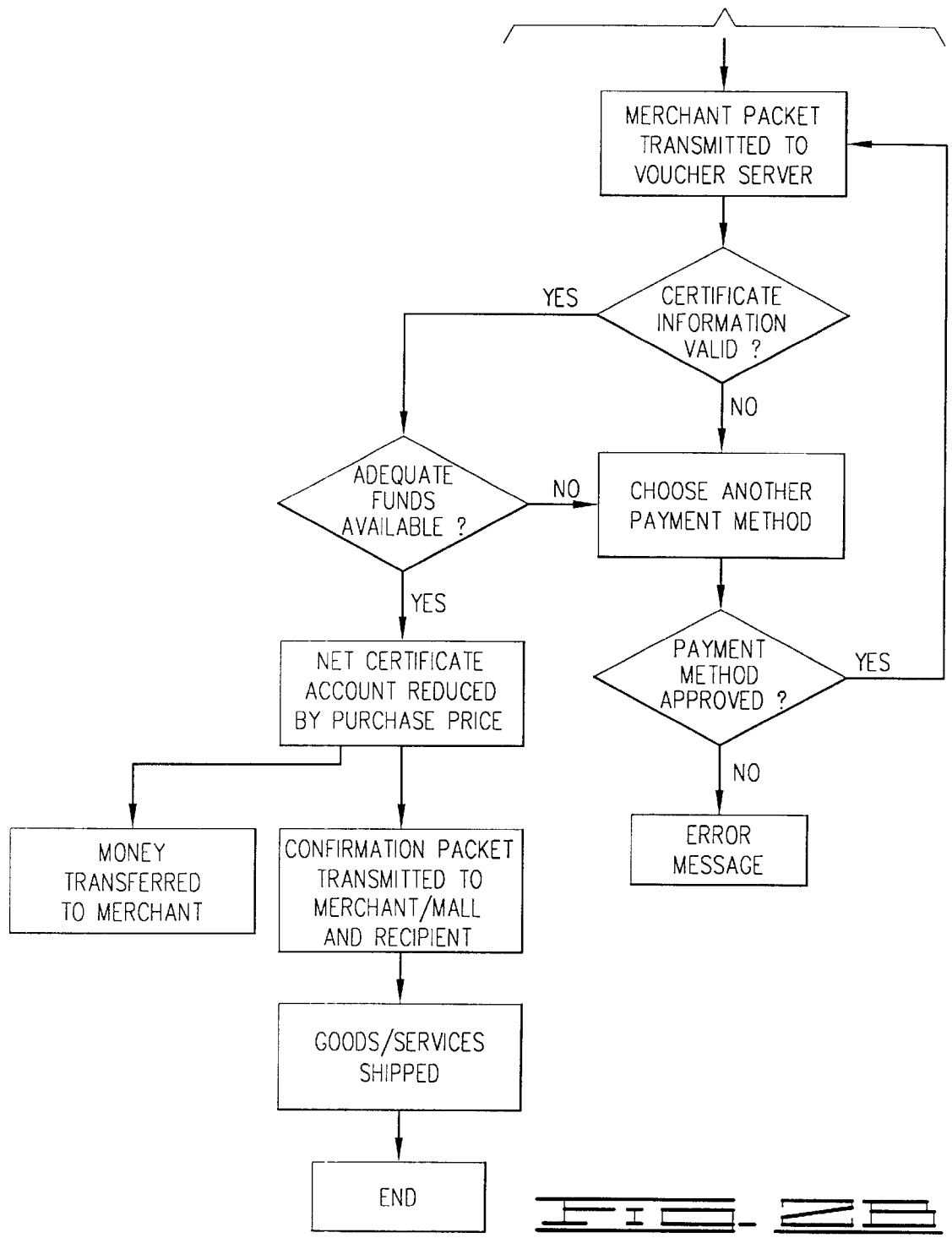

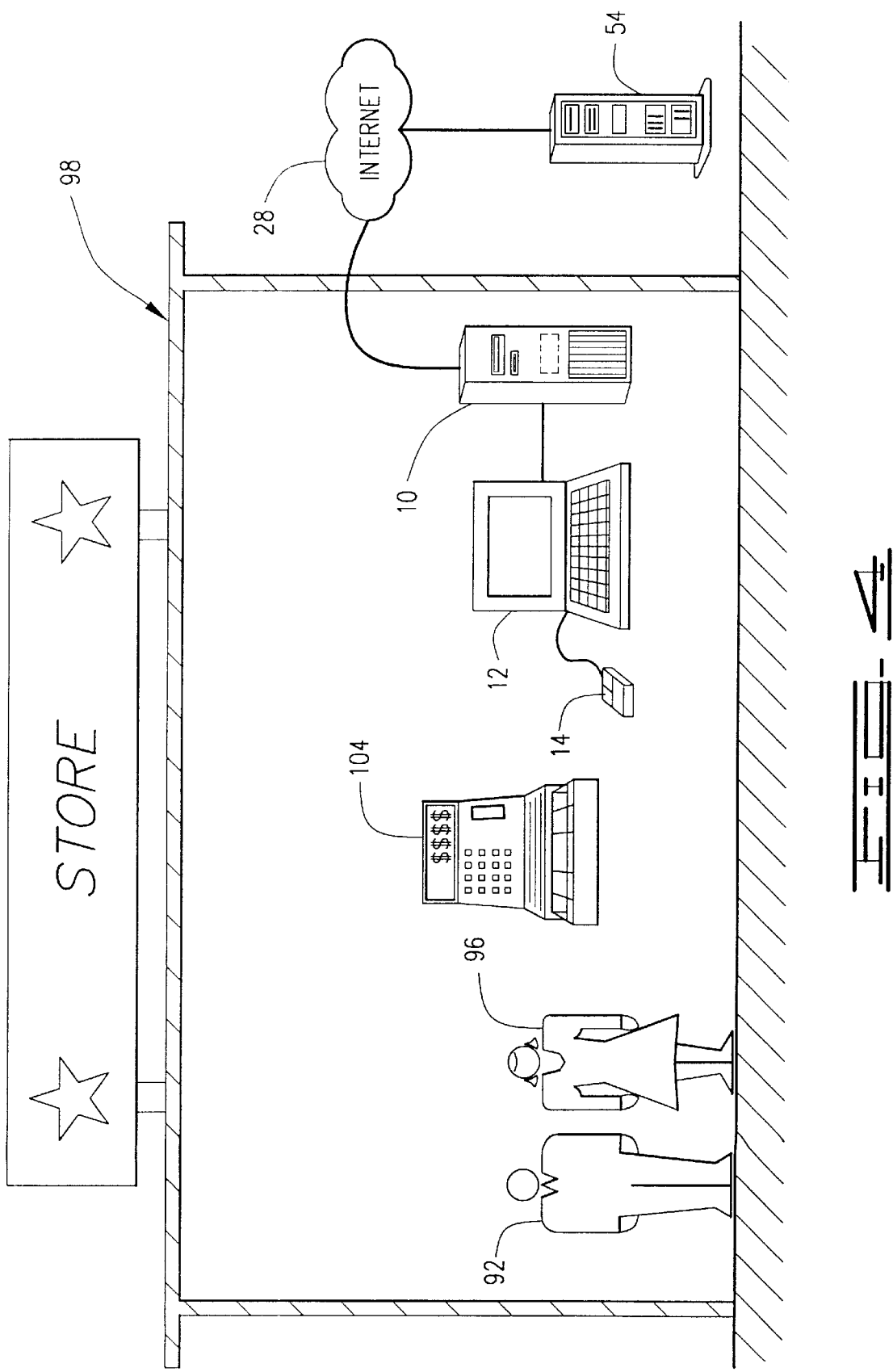

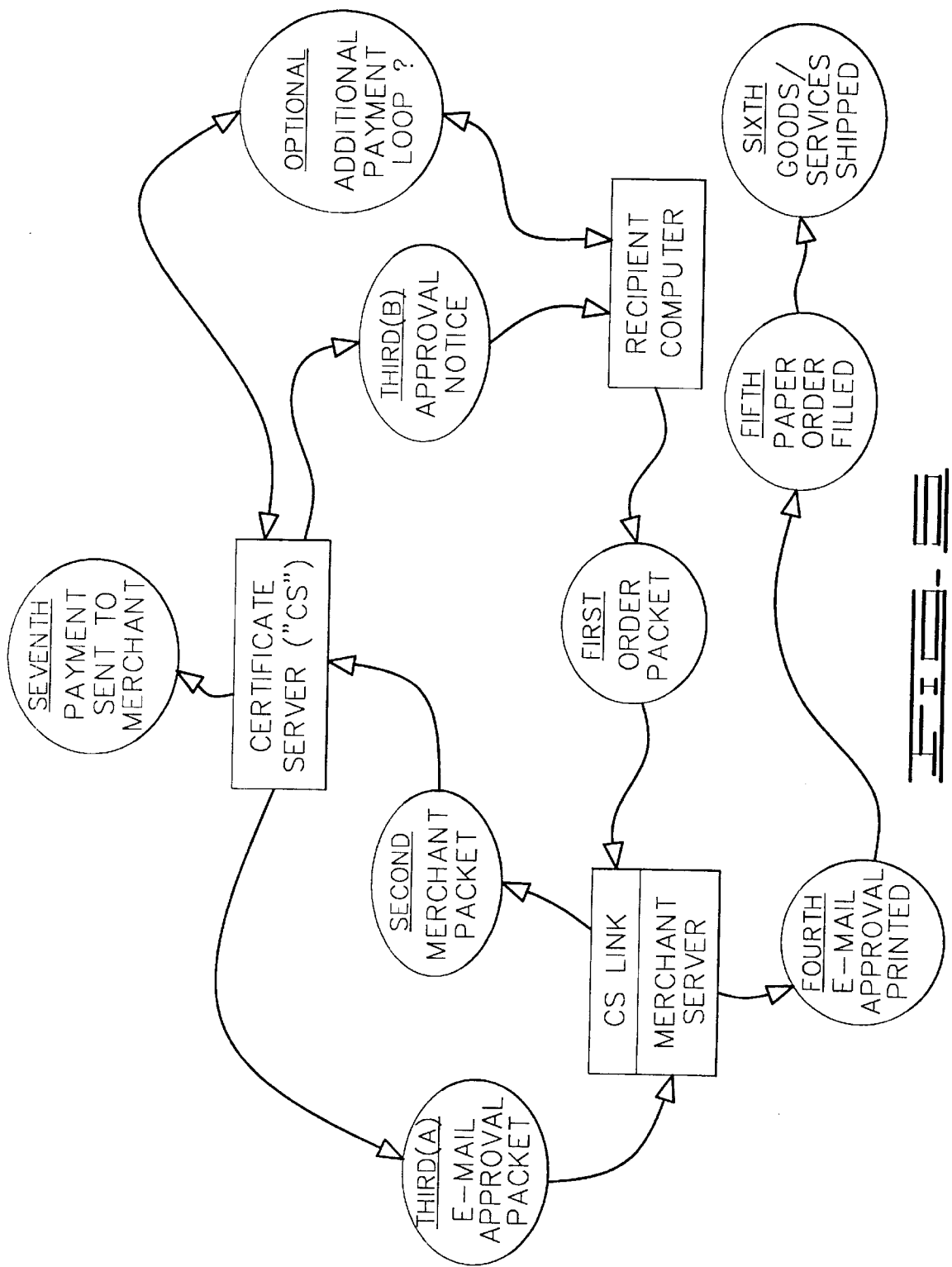

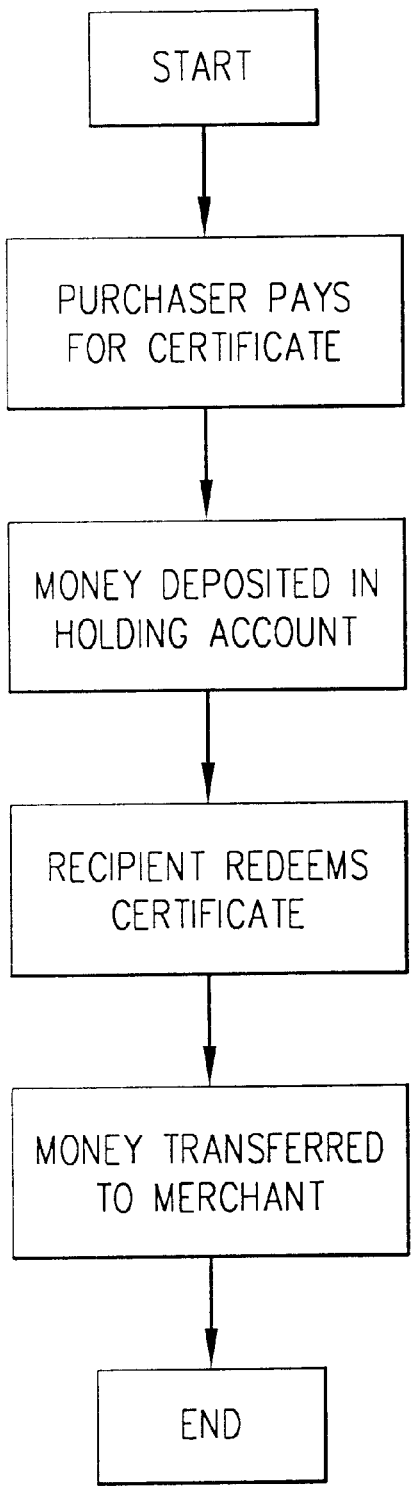
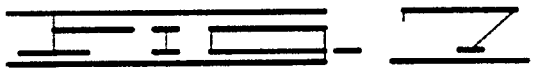

METHOD FOR MARKETING AND REDEEMING VOUCHERS FOR USE IN ONLINE PURCHASES

CROSS REFERENCES TO RELATED APPLICATIONS

This application is a continuation-in-part of a prior application for an Apparatus and Method for Performing Secure Network Transactions received by the PTO Mail Center on Jun. 28, 1998 ("Parent Application"). Another continuation-in-part application of the Parent Application for an Apparatus and Method for Marketing and Redeeming Prepaid Accounts for Use in Online Purchases was filed simultaneously with this application.

BACKGROUND OF THE INVENTION a. Field of the Invention

The present invention relates to methods for marketing and distributing gift certificates and coupons (or generically, "vouchers"). More particularly, the present invention relates to methods for mass, nationwide distribution of vouchers for redemption at a specific merchant/virtual mall, or, more broadly, on the Internet as a whole via a computer network. The present invention is based a centralized voucher server that maintains a database of participating merchants, virtual malls, and of the outstanding vouchers and to what extent they have been redeemed. Software is provided to participating merchants allowing them to provide on-line purchasing and redemption of gift certificates and coupons via a link with a voucher server, without the merchant having the technical components for such services on its own web page or server.

The gift certificates are delivered electronically to the recipient after purchase either over the phone, at a brick and mortar store, at a virtual mall, at a merchant web site, or a web site ran by the operator of the gift certificate system. Coupons may be obtained by visiting the voucher server or by visiting the web sites of participating merchants. Also, coupons may be sent to customers (by any means of communication such as e-mail, regular mail, or the like) based on a customer profile maintained on the voucher server.

b. Description of the Prior Art

The concept of electronic transactions on a computer network is relatively new. Ignoring transactions pursuant to telephone calls involving a real person on each end, the concept of electronic transactions between two electronic devices was practically unknown until banks pioneered electronic transactions for wire transfers of large quantities of cash.

With the rise of the Internet in the early 1980s, long distance electronic transactions became possible for the general public. However, electronic commerce transactions were still relatively rare outside of the above-noted banking transactions until the early 1990s. This was partly because the technologies required for such transactions were not well developed. Also, until the early 1990s there were still a relatively small number of consumers with access to the Internet.

The term "Internet" will be used throughout this document. As used herein, "Internet" means a network of machines accessible to/by multiple users, the machines having the capability, using a common communication protocol, of communicating pursuant to programming commands or information input by users. One specific embodiment of the term Internet is the computer network currently operating to allow users to communicate with remote servers using the common programming language HTML. The terms "computer network," "long distance network," "electronic network" and other variations of these phrases may be used interchangeably in this document, and are intended to be coextensive with the term "Internet."

Recently, there has been an exponential increase in the number of people with access to the Internet. Consequently, Internet business has proliferated. Great quantities of capital have poured into businesses related to the Internet. However, the full potential of the Internet for commercial transactions has not been realized. This is in part due to the fact that many businesses and business services available in the brick and mortar business world are not yet available or are not fully developed in the virtual world.

As an example relevant to this application, there are many sites which enable a user to send a gift certificate for redemption on the Internet via regular mail, via e-mail, or both. Some sites have a convenient way of spending the gift certificate on-line by inputting the certificate number. However, the majority of web sites either do not offer gift certificate capabilities at all, or, if they do offer gift certificates, they do not offer a convenient way to redeem gift certificates on-line.

Giftpoint.com allows a purchaser to buy a gift certificate on-line for use at a participating merchants. A purchase first selects the dollar value certificate they wish to give to a recipient, and pays for the certificate on-line. The recipient can then redeem that dollar value on-line at the Giftpoint.com redemption center for a gift certificate for use at the merchant or merchants of the recipient's choice. For example, if a purchaser gives a recipient a $50.00 gift certificate, the recipient can then go to Giftpoint.com's web site and select a merchant from whom they wish to make a purchase, for example, selecting Barnes & Noble. Alternatively, a recipient can also select gift certificates from more than one merchant, for example, Barnes & Noble and Borders Book Store, so long as each certificate has a value of at least $20.00. The Giftpoint.com site does not allow the recipient to redeem the gift certificate on-line, rather, they can simply obtain the certificate on-line, which the recipient must then take to the actual merchant for redemption.

Several on-line merchants currently offer gift certificates and coupons for use at their own sites. Amazon.com sells gift certificates and provides coupons on-line. Amazon.com also provides on-line redemption of gift certificates/coupons and additional payment (should the gift certificate balance be inadequate to purchase the desired goods), but only at Amazon.com's own web site. Amazon.com does not allow a customer to purchase a gift certificate for redemption at a third party merchant's web site. Amazon.com performs all of the technical, accounting and related functions for themselves, which they are capable of doing since they are among the largest retailers on the Internet. Similarly, Barnes and Noble provides on-line coupons at its web site. However, as with Amazon.com, Barnes and Noble's on-line coupons can only be used at Barnes and Noble's web site.

SUMMARY OF THE INVENTION

It is therefore an object of the present invention to provide a method of marketing gift certificates and coupons (collectively referred to as "vouchers") for on-line redemption. More particularly, it is an object of the present invention to provide a centralized system based on a voucher server, which system can handle marketing and redemption of vouchers for a number of participating third party merchants/virtual malls. This centralized processing frees participating merchants from having to develop the in-house technical expertise necessary to administer such a system.

It is also an object of the invention to provide a plurality of routes for purchasing or receiving vouchers, such as: over the phone, at a brick and mortar store, at a virtual mall, or a merchant web site on-line, or at the web site of the operator of the certificate system. Preferably, regardless of the route by which the voucher is obtained, the actual transaction will be processed by the voucher server to facilitate tracking vouchers and ensure successful redemption. The purchaser of a gift certificate can them elect to have it delivered via regular mail, e-mail, facsimile, telephone, or, potentially via hand delivery (probably only to the purchaser at the store where the certificate is purchased). Delivery of the voucher, according to the method selected by the purchaser, is then attempted, and if successful, the purchaser is notified that the gift certificate has been successfully delivered. If delivery is unsuccessful, the purchaser is contacted and asked to give alternative delivery directions.

It is a further object of the present invention to provide a gift certificate which can direct the recipient to the goods and services pre-selected by the purchaser on-line. For example, if a purchaser has identified a certain blouse at a merchant's web site, the gift certificate will preferably be able to direct the recipient to the web page showing the blouse in question. The recipient is then free to purchase the blouse the purchaser has selected, or the recipient can select another item. Directing a recipient to a particular item may not be possible, depending on the merchant's web site. This "directing" feature may require a purchaser to use frames to select the web page showing the frames in question. Some merchant's web sites do not allow their pages to be framed, so for these merchants, it may not be possible to point a recipient to a particular item.

It is also an object of the present invention to allow the purchaser to specify, if he so desires, where the gift certificate may be redeemed. The purchaser may specify a particular merchant, a virtual mall, or the Internet as a whole. Or, the purchaser may select some subset of the above-noted categories. The method allows for customization of the gift certificate to suit the needs of the purchaser. However, where the gift certificate is purchased through the web site of a participating merchant/virtual mall, not directly on the voucher server, the merchant/mall may restrict the purchaser's choice regarding where the certificate can be redeemed.

It is also an object of the present invention to allow a recipient to select an item which costs more than the remaining monetary balance of the gift certificate account. In such a case, the recipient will be prompted to enter a method for payment of the excess amount. The recipient, for example, can, upon receiving a $50.00 gift certificate, select a $100.00 item. The recipient will be prompted for a payment method to provide the additional money due above the amount of the gift certificate. The recipient can enter information regarding payment by credit card, payment by a second gift certificate, or by the method disclosed in the Parent Application, or in the related continuation-in-part application. It is a related object that a recipient holding a gift certificate may also choose to apply less than the full amount to his purchase. For example, if the recipient holds a $50.00 gift certificate and is purchasing a $52.00 item, he may prefer to use only half on the gift certificate, or $25.00, and remit the remaining $27.00 by credit card or other method of payment. That way he avoids a small, in this case $2.00, charge while retaining a significant amount on his gift certificate for use at a later time.

It is an object of the present invention to provide security for on-line gift certificate purchases. This security is achieved through comparison of information provided by the redeemer with data stored in the voucher server related to the account number in question and the password(s) for the account, if applicable. These security features are transmitted to the recipient in such a manner as to improve the security of the system.

Finally, it is an object of the present invention to provide a centralized processing system for providing accounting and banking functions to participating merchants. Participating merchants are provided with regular accounting information and regular transfers to their bank accounts regarding gift certificate purchases from the merchant's web site. This centralized processing system implemented through a voucher server allows the tracking of customer's purchases. Marketing campaigns and product launches can use this purchasing history data to tailor electronic mailers to customers. These electronic mailers may include vouchers or the like.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will be better understood and the objects other than those set forth above will become apparent when consideration is given to the following detailed description thereof. Such description makes reference to the annexed drawings wherein:

FIG. 4 is a schematic representation of the purchase of a gift certificate at a brick and mortar store.

FIG. 5 illustrates a gift certificate purchase at a merchant without automated order processing.

FIG. 6 illustrates a gift certificate purchase at a merchant possessing automated order processing.

FIG. 7 is a flow chart showing the flow of money according to the present invention.

DETAILED DESCRIPTION OF PREFERRED EMBODIMENTS

Figure 1B:
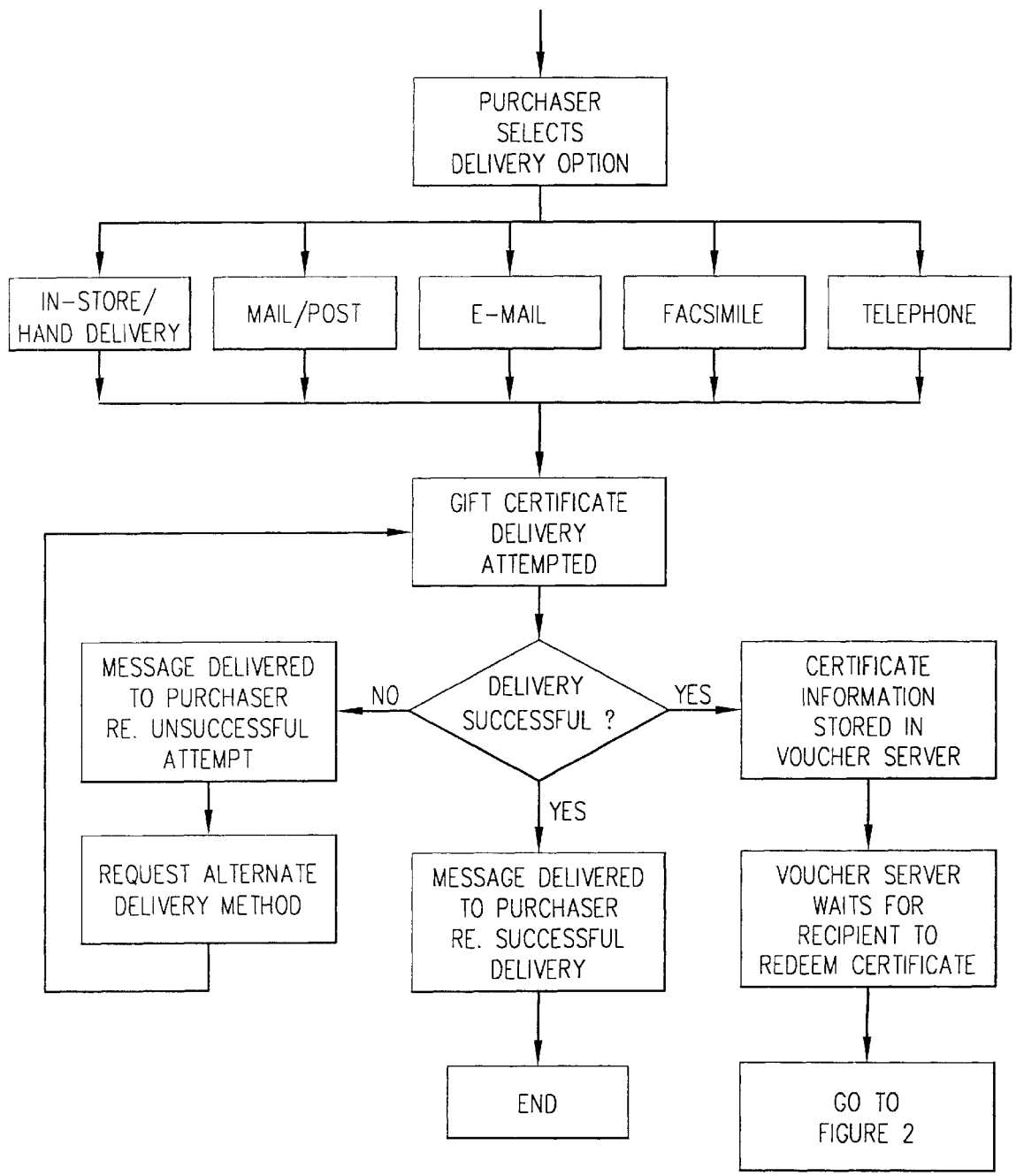
FIG. 1 is a flow chart showing how a gift certificate is marketed.

Referring now to the drawings, where like numerals represent like parts, the present invention incorporates an electronic apparatus 10 such as a personal computer. The electronic apparatus 10 is available for use by a recipient 92. The recipient 92 is a person who has received a gift certificate 100, but he may also be referred to as a "customer" when he is attempting to use a coupon 108, not a gift certificate 100. In this application, the phrases customer and recipient will be used when referring to a person redeeming a voucher. In some transactions, a recipient 92 may use both a gift certificate 100 and a coupon 108.

It should also be understood that while the electronic apparatus 10 probably going to be personal computer, other devises such as a net device such as a "web TV" system could also be used, though improvements and additional features may need to be made to web TV systems presently available before they could accommodate the present invention. In the future, additional devices (such as personal digital assistants) will be developed specifically to access the Internet and to perform transactions thereon. All of these devices can be represented by the electronic apparatus 10.

Cooperating with the electronic apparatus 10 is a display screen 12. The display screen 12 allows the electronic apparatus 10 to display various messages. Also cooperating with the electronic apparatus 10 are one or more data input devices 14. The data input devices 14 could be a keyboard, a mouse, a microphone for inputting the user's voice and/or voice commands, and the like. Additional input devices are possible, and they are intended to be incorporated within the spirit of this invention.

Also incorporated within the electronic apparatus 10 may be an article reader 18. It is anticipated that, if incorporated in the electronic apparatus 10, the article/media 16 will be, at least initially, a read-only compact disc. The article/media 16 could also be any number of other devices, such as a web card envisioned by U.S. Pat. No. 5,247,575. The card in question has the look of a typical credit card, but also can be read by a regular CD reader. A floppy disk with security features could also be used. While the present invention does not use an article 16, it is preferable to have an article reader 18 available so that the present invention can be used in conjunction with the devices disclosed in the Parent Application, and the other continuation-in-part application filed at the same time as the present application, both of which are incorporated in their entirety herein by reference.

The electronic apparatus 10, also will preferably incorporate an electronic wallet 84. Electronic wallets are relatively new software elements. The electronic wallet 84 precludes the need for the user to specifically input his personal data, such as mailing address, social security number, and the like, when purchasing goods or services over the Internet. The electronic wallet 84 may also incorporate features to track expenditures on the Internet.

The electronic apparatus 10 will also incorporate a communication means 26 for communication with a computer network 28. The communication means 26 may be a typical dial-up modem, a cable modem, a dedicated digital connection, a digital service line ("XDSL"), a satellite or other wireless connection, or the like. The communication means must be connected to a communication line for transmitting data to and through the Internet.

Merchants participating in the gift certificate and coupon system will be provided a software patch 106 to be installed on their servers to facilitate voucher transactions. The patch 106 will redirect a recipient/customer attempting to redeem a voucher to the a voucher server 54. A means may be provided for allowing merchants to download the patch 106 through the Internet from the voucher server 54. Alternatively, the patch may be supplied to merchants on a storage medium such as a compact disc, a magnetic disc, or other such storage media.

A gift certificate 100 as used herein means an instrument having associated therewith at least an account number 74 and a monetary value 110. The certificate 100 may also have an associated pin number/password 68, as an optional security feature. A gift certificate may be redeemable at a specified merchant's web site, at a "virtual mall" composed of more than one merchant participating merchant, on some other subset of the participating merchant's web sites (e.g., at all clothing stores), or on all participating merchants without limitation. Preferably, if a password 68 is used for the certificate 100, it will not be distributed at the same time as the account number because, if distributed at the same time, through the same channel, there is little, if any, additional security provided by the password. Two examples of systems which allow for delivery of the account number 74 and the password 68 at different times and/or through different channels are illustrated below.

a. The account number will be assigned by the time the certificate 100 is purchased, and the password 68, if any, will be delivered to the recipient 92 separately. For example, if a purchaser 90 buys a gift certificate in a brick and mortar store 98, he may be given a gift card, which bears the account number 74. The password 68 could then be delivered separately, for example, in the same e-mail notification which alerts the recipient 92 of the purchase of the gift certificate 100.

b. Alternatively, the purchaser 90 can choose or enter a question and an answer where the answer to is known to the recipient 92. The account number 74 is then delivered to the recipient along with the question. The recipient 92 is notified that the password 68 for the certificate 100 is the correct answer to the question posed by the purchaser 90. A hacker intercepting the notification would be unlikely to know the answer to the question, and would thus be unable to use the certificate.

A coupon 108 is an instrument entitling the bearer to a discount on the purchase of goods or services. The discount may be a fixed amount (e.g., $5.00), a specified percentage of the purchase price (e.g., 10% of the purchase price), a percentage which increases based on the purchase price (e.g., 10% of the purchase price if less than $100.00, and 20% of the purchase price if equal to or greater than $100.00). The "coupon" 108 may simply be comprised of an account number 74 used to track the discount in relation to purchases made, in which case, a customer would be prompted to enter the account number 74 at the time his purchase is made, and the discount would automatically be applied by the voucher server 54.

The voucher server 54 tracks each account separately. For gift certificates, each separate purchase is a separate account. For coupons, an account is defined differently from a gift certificate. Coupon accounts will preferably be defined in terms of the type and amount of discount, and where the coupon is displayed. For example, a merchant may publish a coupon on its web site for a 10% discount on any on-line purchase; the same merchant may publish a coupon in a magazine ad also offering a 10% discount. Preferably, each of these coupons would have separate account numbers, tracked by the certificate server 54 to allow the merchant to determine the number of people responding to each form of advertising.

Figure 3:
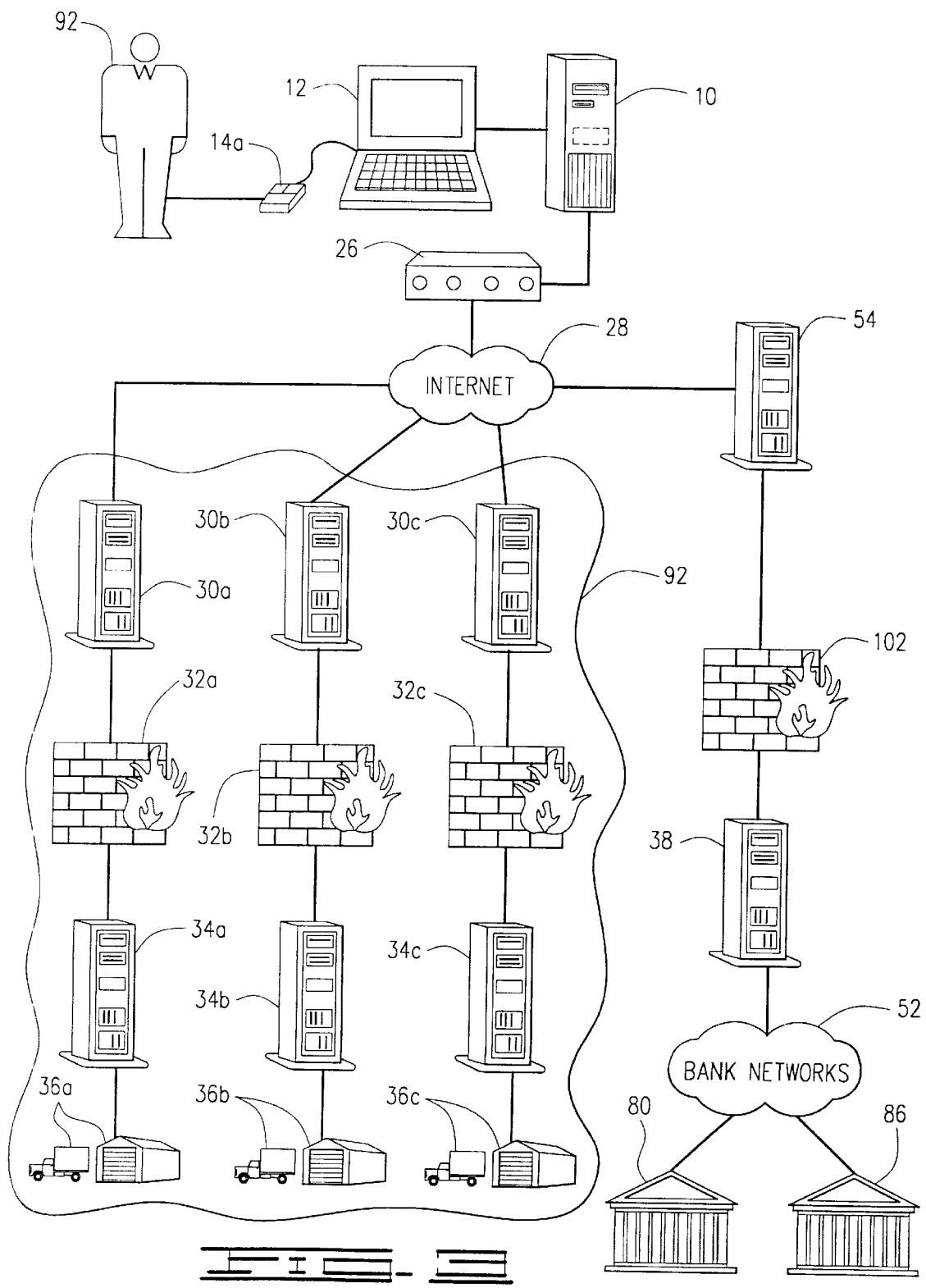
FIG. 3 is a schematic showing the relationship among the various parties to a gift certificate transaction.
Figure 8:
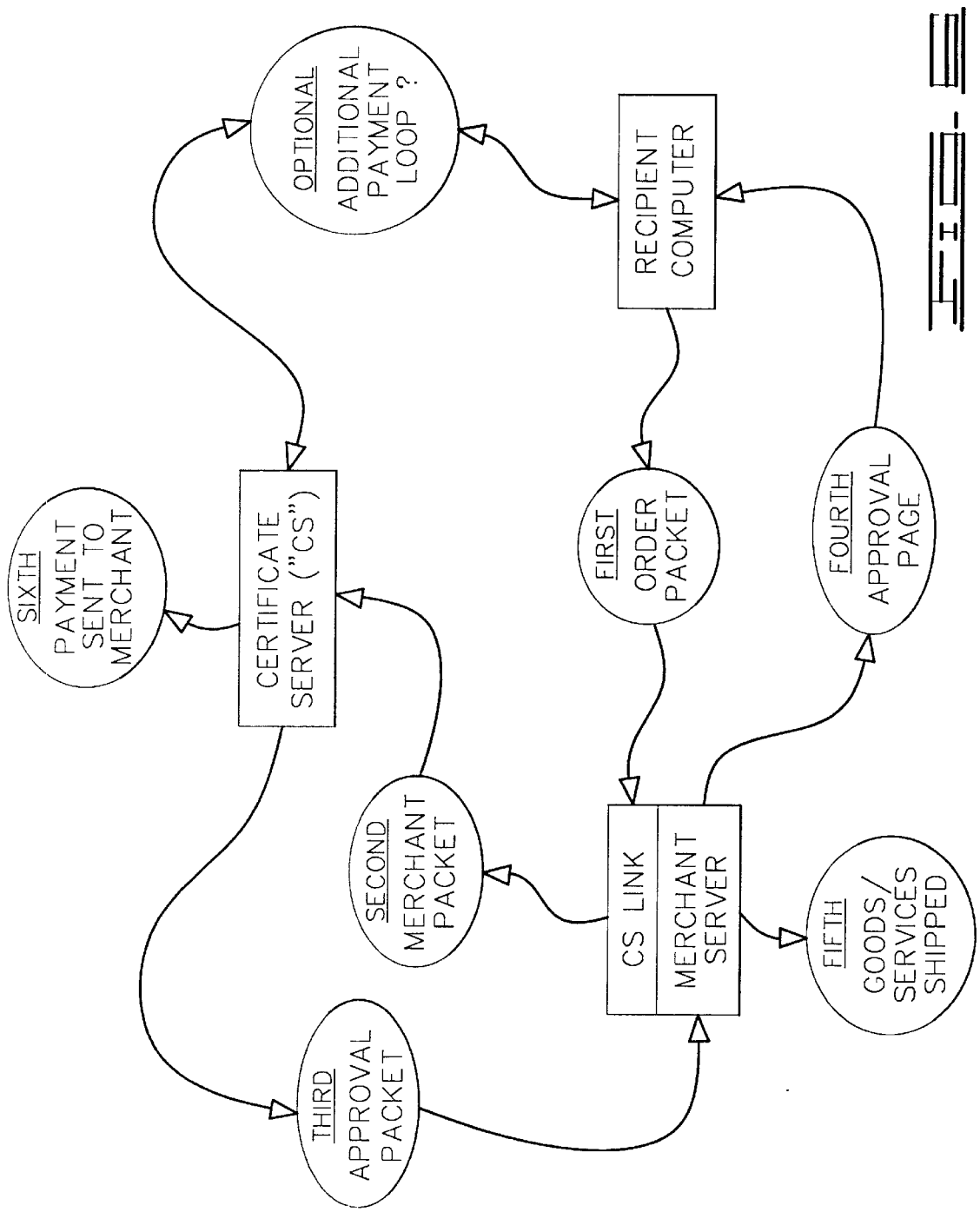

FIG. 3 illustrates the inter-relationship of the elements used to operate the current method. A recipient 92 must have access to an electronic apparatus 10, such as a personal computer. The electronic apparatus 10 will have cooperating therewith a display screen 12, one or more data input devices 14, such as a keyboard and mouse, and further will also have incorporated, or communicating therewith, a communication means 26, such as a modem. The communications means will be in contact with a computer network 28, such as the Internet. Via the computer network 28, the recipient 92 can contact a plurality of merchant servers 30. These merchant servers 30 are in communication through a merchant firewall 32 (for security purposes) with merchant business servers 34 which drive business processes 36, such as inventory and shipping for fulfillment of orders placed over the computer network 28. The merchant firewall 32 prevents unauthorized access the merchant business server 34. More than one merchant server 30 can be grouped together in a virtual mall 94. Also communicating via the computer network 28 is a voucher server 54. The voucher server 54 is in communication through a voucher server firewall 102 with an account information server 38. The account information server 38 may be in communication via a bank network 52 with a merchant bank 80. Further, the account information server 38 may be in communication via the bank network 52 with the recipient's bank 86.

Operation

Figure 2B:
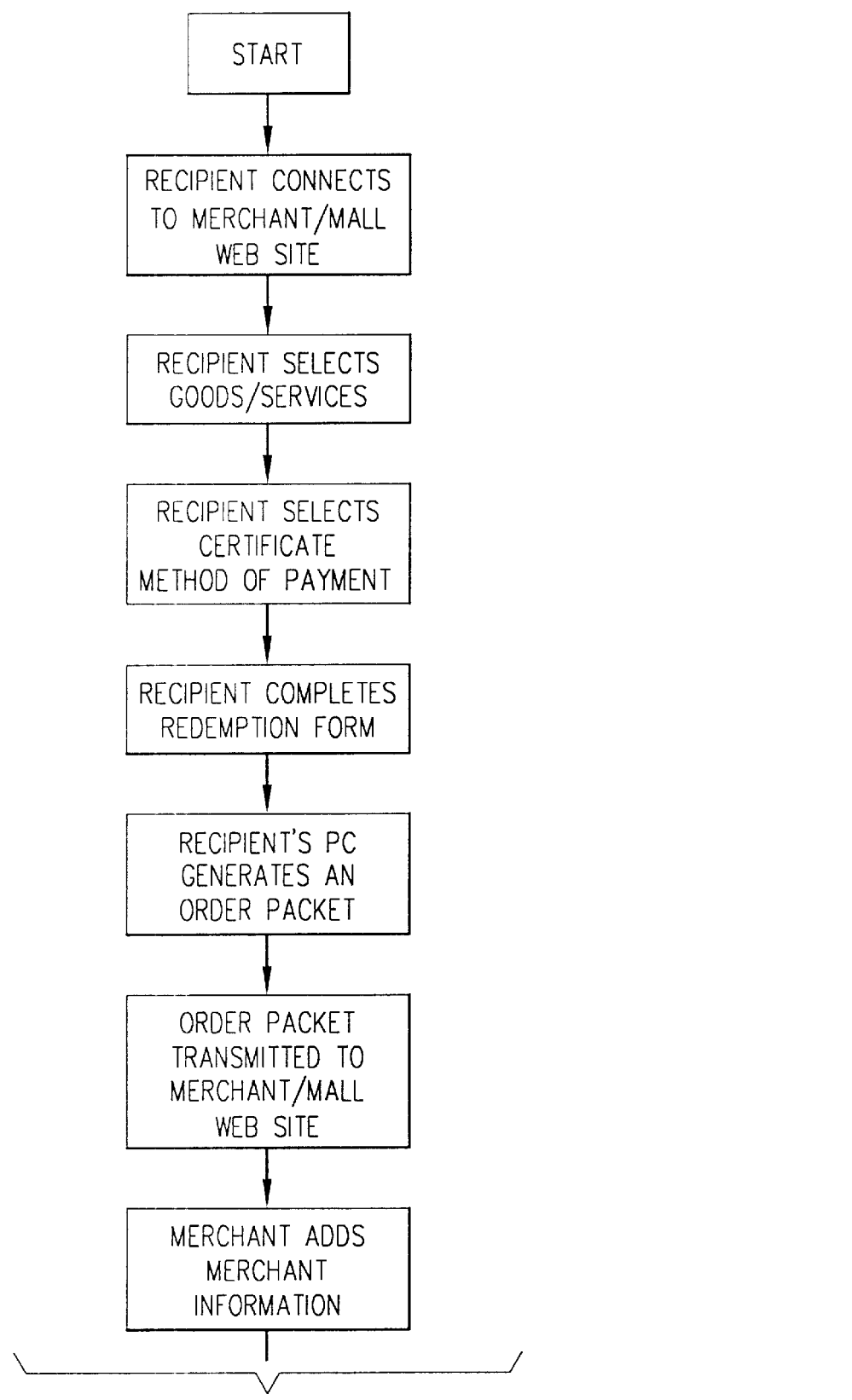
FIG. 2 is a flow chart showing how a gift certificate is redeemed on-line.

FIG. 1 illustrates the purchase of a gift certificate 100. FIG. 2 illustrates the redemption of the same gift certificate. The redemption of a coupon 108 is accomplished in a similar manner to the redemption of a gift certificate. However, discounts given pursuant to coupon 108 redemption are separately accounted for by the voucher server 54.

As shown in FIG. 1, A purchaser 90 first chooses a method for the purchase of the gift certificate 100. A purchaser 90 can purchase a gift certificate 100 either over the phone, at a brick and mortar store 98, at a virtual mall 94, a merchant web site 30, or at the voucher server web site 54. It is strongly preferred, however, regardless of the means of purchasing the certificate, that the purchase be processed through the voucher server 54.

The purchaser 90 may then be able to select the merchant (s) and/or mall(s) (collectively as used herein, "merchants") which the purchaser wishes the gift certificate 100 to be good for, or the purchaser 90 may select all merchants cooperating with the system. That is, if the purchaser 90 selects this "all merchants" option, the recipient 92 will be able to use the gift certificate 100 at a wider range of stores.

If, however, the purchaser 90 has accessed the voucher server 54 via a merchant or virtual mall web site, his only option may be the purchase of a certificate 100 from the merchant or mall through which he accessed the server 54. The merchant or mall through which the purchase 90 accessed the voucher server 54 will be referred to as the sending server 110. This restriction to only allow the purchase of a certificate from the sending server 110 will be an option for participating merchant(s) and mall(s). Merchants who choose this option may believe that restricting the purchaser's options increases the chance the purchaser will by a gift certificate from the sending server 110 rather than some other merchant or mall. Once a purchaser 90 has purchased a certificate 100 from the sending server 110, however, the voucher server 54 may "suggest" to the purchaser 90 other merchants with goods and services which are compatible with, complementary to, or tied in with those of the sending server 110.

The purchaser 90 may be able to specify the goods or services he wishes to appear on the gift certificate 100. Specifying the goods or services the purchaser 90 wishes to highlight may present technical problems, particularly since some merchants do not allow their web pages to be "framed." Framing involves allowing the viewing of two unrelated web pages simultaneously. In this case, the voucher server 54 would frame the merchant's web page, and a purchaser 90 would navigate to the desired web page on the merchant's site, then record his choice on the voucher server page which surrounds (i.e., frames) the merchant's page. Another method, simpler for the system administrator, but more complicated for the purchaser 90 requires the purchaser to copy the address of the desired page, then to paste type or paste it into the appropriate data field in the certificate order form. However, technical issues notwithstanding, it is desirable to offer the purchase 90 the option of specifying particular goods/services for consideration by the recipient 92.

The purchaser 90 also may be able to specify whether he wants the purchase to be anonymous and/or a "surprise." If the purchaser elects to make the certificate 100 to be anonymous, the recipient 92 will not be notified who the certificate is from until the recipient "opens" the certificate. If the purchaser 90 elects to make the certificate 100 a surprise, the recipient 92 will not know the amount nor the merchant(s)/mall(s) until he opens the certificate. If a certificate 100 is delivered electronically (e.g., by e-mail), it will preferably be "opened" by selecting (i.e., double mouse clicking) an icon on the e-mail which, for example, looks like a wrapped package.

It is preferable that the purchaser 90 supply his name and at least one "address" (preferably, the purchaser will supply both a mailing and an e-mail address) as a part of the purchase. This allows the purchaser 90 to be contacted if delivery is unsuccessful. It is again preferable that the purchase 90 also be notified of successful delivery of the gift certificate 100, but if the purchaser does not provide an e-mail address, notification by regular mail would add an additional cost to the system (paper, postage, labor, etc.), so regular notification of successful delivery may not be appropriate.

The purchaser 90 must then select the method of payment such as cash, check, credit card, debit account, or the like. Where, as shown in FIG. 4, the transaction takes place at a brick and mortar store 98, the payment will probably be processed on the store's standard payment system 104. Payments by purchasers will be sent to a central bank account either individually, or in batches (probably at the end of each business day). On-line transactions will preferably be processed through an automatic payment system incorporated within the voucher server 54.

If the payment method selected by the purchaser 90 is approved, the purchaser 90 selects a delivery option, such as: in-store/hand delivery if the purchaser is buying it at a brick and mortar store; delivery by regular mail/post; delivery of a virtual card and notification by e-mail; delivery notification by facsimile; or, finally, delivery by a phone message. A processing fee may be charged for higher cost delivery options such as regular mail.

If the purchaser 90 elects to have a card delivered, they can choose either a real or virtual card from those available. The purchaser 90 may also be able to specify a special message to the recipient 92. The purchaser 90 may then specify the date of delivery and the significant date (if different from the date of delivery). The significant date would be, for example, a birth date, an anniversary, or the like, and the purchaser may elect to have the gift certificate delivered before the significant date.

It may be preferable to have a password/pin number 68 associated with the certificate 100 for security purposes. However, there is little, if any, additional security with a password where the account number 74 and the password 68 are provided at the same time through the same channel. As discussed above, the password and account number should be provided by secure means—that is, at different times or through different channels (for example, the account number included with a physical gift card, and the password delivered via e-mail). As an alternative, the purchaser 90 may type in a personalized question and answer for the recipient 92. The answer to the question will be something known to the recipient, and will preferably have a simple one-word answer, but will be something a hacker would be unlikely to know. Thus, when the gift certificate is delivered to the recipient, he would be asked the personalized question, to which he can type in the answer. The answer then becomes the password for the gift certificate. Still another alternative is to ask the purchase to enter personal information about the recipient, such as his birth date, business address, home address, hair color, home town, or the like. As used herein, "personal information" shall generally mean that minimum information necessary regarding both the purchaser 90 and the recipient 92 to enable the system to operate. When the certificate is delivered to the recipient illustrates a gift certificate purchase at a merchant without automated order processing 92, the recipient is then asked to enter the same information provided by the purchaser 90. Preferably, a "natural language" text engine will be used to match the recipient's responses to those entered by the purchaser; otherwise, small differences in how the responses are entered might prevent the recipient from successfully redeeming the certificate 100.

Once the purchase form is completed and payment is approved, the voucher server 54, and associated business processes then attempt to deliver the gift certificate 100. If delivery is successful, a message may be delivered to the purchaser 90 regarding successful delivery and the certificate information is stored in the voucher server 54 for redemption by the recipient 92. However, if delivery is unsuccessful, for example, a letter is returned, or e-mail is undeliverable, a an attempt is made to deliver a message to the purchaser 90 regarding the unsuccessful attempt at delivery to the recipient 92. This system queries the purchaser 90 for an alternative delivery method. Then, delivery is re-attempted, and this process repeats itself until delivery is successful or for a specified maximum number of iterations.

FIG. 2 illustrates the redemption of the gift certificate by the recipient 92. The recipient 92 first connects to the appropriate merchant/mall web site or to the voucher server 54 directly. The purchaser's choices regarding where the certificate 100 may be redeemed may be restricted by the options selected by the purchaser 90 or pursuant to restrictions due to the sending server 112. For example, if the purchaser 90 selects the gift certificate to only be good at one merchant, the recipient 92 must select that web site from which to make his purchase.

The recipient 92 then selects the goods or services 70 he wishes to purchase. If the purchaser 90 specified particular goods or services for the recipient to consider, he may first be directed to the appropriate web page to view those goods or services.

From the available choices for payment, the recipient 92 selects a gift certificate method, which directs him to the voucher server 54. At that point a redemption form generated by the voucher server 54 appears on his computer screen. The recipient 92 completes the redemption form and then submits it, causing an order packet 56 to be transmitted to the voucher server 54 via the merchant or mall's web site.

As the order packet 56 passes through the merchant/mall web site, the merchant/mall adds information such as its merchant number 76, the monetary amount of the purchase, and a transaction number (the amount and the transaction number referred to as the "common data" 66), creating a merchant packet 60. The merchant packet is transmitted to the voucher server 54.

The voucher server 54 insures that the gift certificate information in the merchant packet 60 is valid, i.e., that the certificate is active, that the password, if applicable, is valid, and that there is a sufficient balance to pay for the purchase. If the merchant packet is not valid the recipient 92 is instructed to chose another method of payment or to re-enter the gift certificate information. The recipient 92 will also be prompted to enter an alternative payment method if the cost of the goods/services 70 exceeds the remaining certificate balance on the gift certificate 100.

Once sufficient funds are approved, the gift certificate account balance is reduced by the amount applied to the purchase. The recipient 92 is notified of the amount of the purchase and the remaining certificate balance, if any, which can be applied to subsequent purchases. The recipient is also notified of any other payments credited toward the purchase.

Preferably, the redemption routine allows a user to choose how much of the remaining certificate balance he wants to apply to the purchase. If the user has selected a $52.00 item, but only has a $50.00 gift certificate, he may choose to apply only $27.00 of the available funds so as to avoid a small, $2.00 charge on his alternative payment account. Similarly, if the goods/services 70 selected cost more than the remaining balance on the certificate 100, the user will be prompted to enter an additional payment source, such as the payment method specified in the Parent Application.

A confirmation packet is then transmitted to the merchant/mall and to the recipient 92. The payment 88 is transferred to the merchant's account 80. The merchant then ships the goods or services 70.

FIG. 4 illustrates the purchase of a gift certificate in a brick and mortar store 98. A purchaser 90 enters the brick and mortar store 98. The purchaser 90 may be able to place his order directly on an electronic apparatus 10 provided in the brick and mortar store 98 for use by customer. He may also be able to buy a gift certificate 100 with the assistance of a clerk 96. The purchaser 90 then preferably pays for the gift certificate 100. Where the purchase uses an electronic apparatus provided for customers, the process proceeds as described above. Alternatively, where the clerk processes the purchase, payment may be made using the store's standard payment system 104, in which case, the purchaser 90 may use any method of payment accepted by the store's payment system 104. Either at the time of the purchase or later (probably in a batch transfer), payments received by the store 98 for gift certificates 100 are relayed to the operator of the present voucher server. These payments are retained in a centralized account to pay for purchases as they are made by recipients 92.

The purchaser 90 may receive a physical gift card bearing the account number 74 and the monetary denomination of the certificate 100. Alternatively, the purchaser may have a "virtual" card sent to the recipient 92 via e-mail. However the certificate is delivered, it will include at least the monetary denomination and an account number. If the purchaser 90 set up a personalized question and answer to serve as a password, the personalized question will also be provided to the recipient 92.

Upon receiving notification of the gift certificate 100, the recipient 92 may be offered the option of sending a "thank you" card to the purchaser 90. Since the purchaser 90 provided their address upon purchasing the gift certificate 100, the address will be available on the voucher server 54. Therefore, the recipient can simply select a card which will then be automatically be delivered to the purchaser 90. The recipient 92 may also add a special thank you message to be included with the card to be delivered to the purchaser 90.

FIGS. 5 and 6 illustrate the flow of information for the present method. The flow of information for a merchant with limited computer order processing capabilities is illustrated in FIG. 5. The flow of information for a merchant with more sophisticated computer order processing capabilities is illustrated in FIG. 6.

In FIG. 5, the recipient computer sends an order packet 56 to the merchant server 30. The order packet 56 is routed through a link at the merchant server—where merchant information is attached such as merchant identification number, the amount of the purchase, and a transaction number—to the voucher server 54. The voucher server 54 verifies the validity of the certificate information (and other payment information, if applicable), and sends an e-mail approval packet 62 to the merchant server 30. As discussed above, there is an optional step allowing for additional payment if requested by the recipient or required because the balance remaining on the certificate 100 is insufficient to cover the cost of the goods/services selected. The merchant then prints out the e-mail, and fills it as a paper order, shipping the goods and services. An approval notice is sent by the voucher server 54 to the recipient's electronic apparatus 10. The unsophisticated merchant server, has little or no computer capability, beyond the ability to host a web page and receive e-mails, may not keep a computer tally of certificates purchased. Rather, the e-mail order is printed by the unsophisticated merchant and tracked as typical paper order within the merchant's system.

FIG. 6 illustrates the same basic scenario, but with a more computer sophisticated merchant. The order packet 56 is again sent through the merchant server 30 which attaches the merchant information (the same as for an unsophisticated merchant, above) creating a merchant packet 60 which is transmitted to the voucher server. If the purchase is approved, an approval packet is sent to the merchant server. As discussed above, there is an optional step allowing for additional payment if requested by the recipient or required because the balance remaining on the certificate 100 is insufficient to cover the cost of the goods/services selected. The merchant server maintains a computer database of purchases. The merchant business processes 36 then fulfills the order from the merchant's computer data base. The merchant server 30, upon receipt of the approval packet 62 relays approval page (which may actually be present on the voucher server 56) back to the recipient's electronic apparatus 10. At the conclusion of both the process for the simple merchant and for the more sophisticated computer capability of a merchant, the payment is sent to the merchant following transmission of the approval packet to the merchant.

FIG. 9 illustrates the flow of money in the present method. The purchaser 90 pays for the gift certificate 100 at the time it is bought. The money paid by the purchaser is deposited into a central account to be used to pay for gift certificate purchases as they occur. When the recipient 92 uses its gift certificate 100 the money is transferred to the merchant's account. This ends the cycle of the money transfer. Until they are used by recipients, the operator of the system can use the money in the holding account for investment, and can retain the interest earned thereon.

Preferably, there will be an agreement between the purchaser 90 and the operator of the system whereby any gift certificate funds not used within a specified time frame (for example, one year), will be forfeited to the operator of the system. As an alternative, extra expense feature, the purchaser 90 may be able to purchase "insurance" which allows any unused portion of the gift certificate to be returned to the purchaser 90 if not used by the recipient 92 within the specified time frame.

The present invention works in a similar manner for the redemption of coupons 108 as for the redemption of gift certificates 100. No money changes hands with coupons 108. Rather, coupons entitle the bearer to a specified discount upon the purchase of goods and services.

The voucher server 54 will preferably offer a number of coupons 108 for redemption at merchants and virtual malls participating in the system. The number of coupons available on the voucher server 54 will tend to entice Internet shoppers to the voucher server 54, thus increasing the number of "hits" or visits to the server 54. The increased number of hits will allow the operator of the system to sell banner advertising and other related goods and services. It should increase the viability of the voucher server 54 as a portal site through which people enter the Internet and at which people begin their on-line purchasing.

The voucher server 54 will offer accounting services for merchants malls related to coupons 108. These services will include an "account" for each coupon offered by the merchant mall. The account for each coupon 108 will track the monetary value of purchases made using the coupon and the monetary value of the discounts applied.

As with the gift certificate system, a purchaser will be present with the option to redeem a coupon with his purchase. "redeeming" the coupon may be as simple as entering a coupon number along with other purchase information.

Having thus described the invention, I claim:

1. A method for marketing and redeeming vouchers for redemption by customers purchasing goods/services on a common computer network using electronic apparatuses, the method comprising:
   a. providing a voucher server having installed thereon software for tracking purchases using vouchers and for accounting for balances of multiple voucher accounts;
   b. linking merchant web sites to the voucher server and to customer's electronic apparatuses server via the computer network;

c. installing software on the merchant web sites, the software directing customers to the voucher server for processing purchase transactions and accounting for redemption of vouchers;

d. accounting to merchants for transactions using vouchers.

2. The voucher method of claim 1 where each voucher has an account number to facilitate tracking purchases related thereto.

3. The voucher method of claim 2 where each voucher has a password, provided to the purchaser via secure means for ensuring the security of transactions performed with the voucher.

4. The voucher method of claim 3 where the voucher server separately accounts for gift certificates and coupons and provides a regular accounting and to each merchant of the value of both type of voucher redeemed on the system and automated transfers of monetary value pursuant to gift certificate purchases.

5. A method for marketing and redeeming gift certificates for redemption by recipients purchasing good/services on a common computer network using electronic apparatuses, the method comprising:
   a. collecting information from a purchaser relevant to the purchase of the gift certificate including:
      i. the purchaser's personal information,
      ii. the monetary amount of the gift certificate,
      iii. the recipient's personal information,
      iv. the delivery method,
      v. merchant(s) at which the certificate is to apply, and
      vi. Personal information regarding the recipient;
   b. receiving and verifying a payment from the purchaser;
   c. storing the collected information on a voucher server in communication with the computer network;
   d. delivering a notice of the gift certificate to the recipient, the notice including a gift certificate account number, the monetary amount, and any other information necessary to redeem the gift certificate;
   e. linking the recipient's electronic apparatus to a merchant site for transmission of information regarding the goods and services to be purchased;
   f. collecting redemption information from the recipient;
   g. approving the purchase by verifying at least the account number and monetary amount;
   h. notifying the merchant and the recipient of the approval of the purchase;
   i. paying the merchant; and
   j. reducing the gift certificate account to adjust for the purchase made.

6. The gift certificate method of claim 5, where, if the amount of goods and services to be purchased are greater in value than a remaining balance on a gift certificate account, an alternative payment method requested from the recipient to pay the excess above the remaining balance.

7. The gift certificate method of claim 6, where the gift certificate is purchased on a computer network.

8. The gift certificate method of claim 6, where gift certificate is purchased in a brick and mortar store.

9. The method of claim 6, where the gift certificate is purchased via the telephone.

10. The gift certificate method of claim 6 where the notification provided to the recipient provides a means for identifying goods/services suggested by the purchaser.

11. The gift certificate method of claim 6 where the notification provided to the recipient provides a link to a specific web page displaying the goods/services the purchaser intends for the recipient to buy with the certificate.

12. The gift certificate method of claim 6 where a recipient may choose to apply less than the remaining balance to his purchase and to select another payment method for the excess.

13. A coupon method for distributing coupons to customers for redemption on-line in purchasing good/services on a common computer network using electronic apparatuses, the method comprising:
   a. linking the electronic apparatus to a merchant site for transmission of information regarding the goods and services to be purchased;
   b. collecting coupon redemption information from the customer;
   c. approving the purchase by verifying at least the coupon account number and approving a payment method;
   d. notifying the merchant and the recipient of the approval of the purchase.

14. The coupon method of claim 13 where the purchase pays at least a portion of the purchase price using a gift certificate.

15. The method of claim 6 where the purchaser has the option of limiting redemption of the gift certificate to one or more specified merchant(s).

16. The method of claim 6 where the purchaser has the option of limiting redemption of the gift certificate to one or more classes of specified merchant(s).

* * * * *